July 20, 1943.  G. P. BOSOMWORTH  2,324,977
LATEX DEPOSITING APPARATUS
Filed Aug. 23, 1939
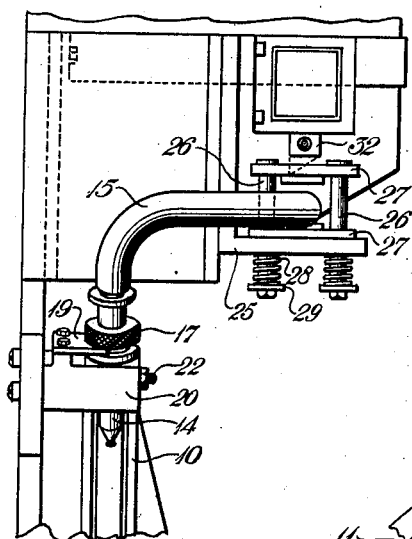
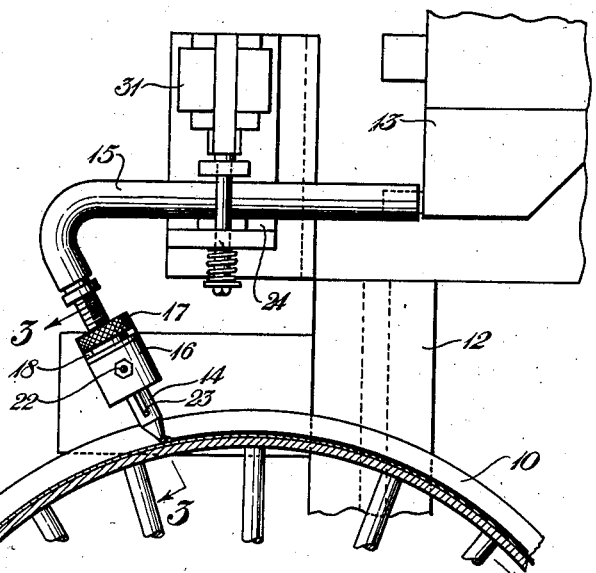
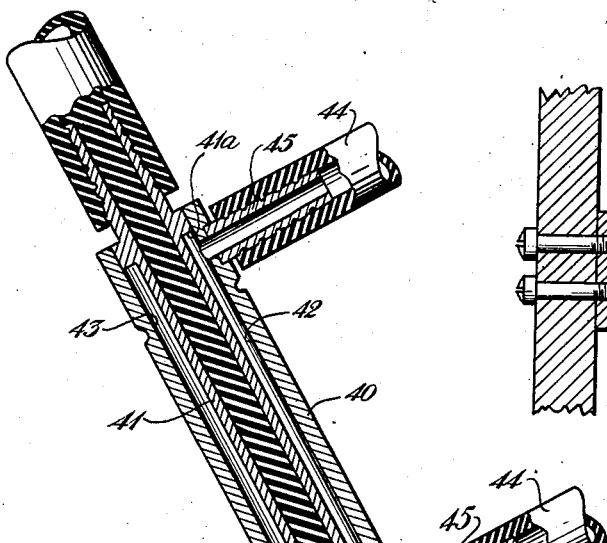
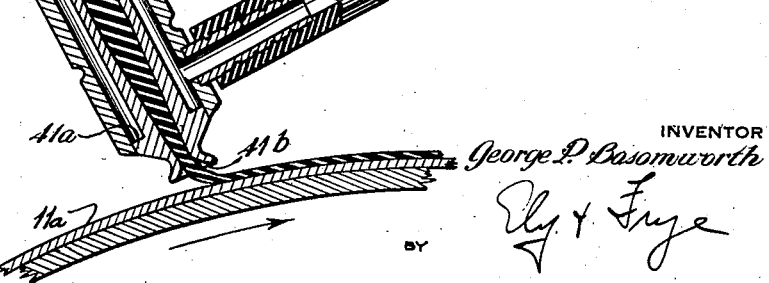
INVENTOR
George P. Bosomworth
BY Ely Y. Frye
ATTORNEYS Patented July 20, 1943

2,324,977

UNITED STATES PATENT OFFICE 2,324,977

LATEX DEPOSITING APPARATUS

George P. Bosomworth, Akron, Ohio, assignor to The Firestone Tire & Rubber Company, Akron, Ohio, a corporation of Ohio Application August 23, 1939, Serial No. 291,559

4 Claims. (Cl. 18—15)

This invention relates to the formation of continuous strips or threads of rubber, especially to the production of such strips from fluid dispersions of rubber wherein the fluid is deposited and dried upon a backing surface.

Heretofore, dispersions of rubber have been deposited continuously upon a backing surface, which may be an endless moving belt, by several devices. One comprises a rotating disk which dips into the dispersion of rubber and deposits the rubber on the surface of a moving belt, or cylinder that is immediately adjacent the surface of the disk. Another is by use of a pen that contacts a moving belt to form a continuous film of dispersion thereon. All known depositing methods seem to be somewhat undesirable, in that they do not deposit a uniform film of dispersion, are too difficult to regulate, produce excessive belt wear, or have other disadvantages.

A general object of this invention is to deposit a continuous uniform film of a rubber dispersion upon a moving surface. Also, an object is to control, readily, the flow of dispersion to the moving surface. Other objects will be manifest from the specification.

The invention will be described with particular reference to the accompanying drawing in which:

Figure 1 is an elevation of apparatus embodying the invention;

Figure 2 is a right side elevation of the apparatus of Figure 1;

Figure 3 is a section on line 3—3 of Figure 2; and

Figure 4 is a sectional elevation of a modified form of depositing means of the invention.

In Figure 1 there is shown a fragment of a sheave 10 around which is led an endless belt 11 that is driven by suitable means (not shown). The sheave 10 is journalled on suitable means that may be carried on frame 12. A container 13 in which a fixed head of latex is maintained in any desired manner is supported on the frame 12. The latex is deposited onto the belt 11 through a nozzle 14, having a circular orifice 14a therethrough, which is connected to the source of latex by a flexible tube 15. This nozzle 14 has a threaded outer periphery and extends through, and is positioned by a sleeve 16 that is part of a bracket 20 which is secured to the frame. The position of the nozzle relative to the sheave 10 is controlled by a knurled nut 17, having a circumferential recess 18 therein, that engages with the threads on the nozzle. The nut 17 is held in fixed vertical position by an arm 19, secured to the bracket 20, which has a slotted end 21 that engages with the recess 18. Then rotating the nut 17 moves the nozzle towards or away from the sheave as a threaded pin 22, engaged with the sleeve 16, extends into a longitudinally directed recess 23 in the nozzle to prevent same from rotating with the nut 17.

Note that the nozzle 14 is spaced from the belt 11. This is a feature of the invention as the spacing, plus contouring the end of the nozzle similarly to the adjacent portion of the belt, aids in drawing the latex out of the nozzle; while once latex is placed on the belt and it is drawn away from the nozzle by the movement of the belt, the surface tension of the latex aids the latex flow to the belt. This has been proven by experiments which show that a larger amount of latex is deposited on a moving belt than on a stationary belt. Then too, spacing the nozzle from the belt eliminates, or at least reduces the tendency of the latex to coagulate as it is drawn from the nozzle and avoids wear on the belt caused by depositing means bearing thereon. While the nozzle orifice 14a is circular in section, it deposits a substantially flat (slightly convex upper surface), straight film of latex on the belt. The size film can be controlled by the distance that the nozzle is from the belt and by restricting the flow of latex through the tube 15. Sometimes it is desirable to use a nozzle having other than a circular orifice.

Means are provided to shut off the flow of latex when desired. These means may comprise a pinch clip 24 that is positioned around the tube 15. This clip 24 is carried on the frame 12 by a bracket 25 that engages with parallel arms 26 of the clip, which arms 26 carry bars 27 between which the tube 15 is received. These arms extend below bracket 25 and carry springs 28 which are held thereon by washers 29. The springs bear on the bracket 25 and normally act to draw the bars 27 towards each other, thereby to compress tube 15 and prevent latex flow therethrough. A solenoid 31 having a core 32 that engages with the upper member of the bars 27 is associated with the clip 24. Thus upon energizing the solenoid the arms 26 are drawn up, springs 28 compressed, and latex permitted to flow. When the solenoid is de-energized, the springs 28 act to compress the bars 27 onto the tube and latex flow is prevented.

A modified type of nozzle which may be retained at a given temperature is shown in Figure 4. Here nozzle 40 is made in two parts, one being the tubular core 41 and the second being tube 42. Tube 42 is suitably secured to flanges 41a on the core 41 adjacent the ends thereof so that a tubular opening 43, extending substantially the length of the nozzle, is formed therein. Flexible tubes 44 connect to nipples 45 that in turn are carried by tube 42 and connect to the tubular opening 43, as shown, whereby fluid may be circulated through the nozzle. Usually it is desired to cool the nozzle as some latices have increased tendency to coagulate if their temperatures are elevated. The nozzle 40 may have a threaded exterior and be mounted as is the nozzle 14. If desired, the nozzle 40 can be mounted in any other suitable manner.

Note that the end or nozzle 41b of the tubular core is flared outwardly, similarly to a Venturi nozzle, said nozzle being flared outwardly along all planes which intersect the axis of the nozzle. Then the rear portion of the nozzle 41b is closer to the belt 11a than is the forward portion of the nozzle in contrast to the even spacing of all portions of the end of the nozzle 14 from the belt 11. However, it has been found that this type of nozzle is very good for depositing latex, probably because the latex doesn't contact the edges of the nozzle at all in flowing through the nozzle.

It will be observed that the flow of latex can be regulated by the initial setting of the solenoid 31, which is bolted to the frame, as shown. Of course, other suitable means may be used to control the feeding of the latex, one other method being to vary the head of latex maintained in the container 13. In all events, a controllable film of latex is continuously deposited on the endless belt without any wear thereon by practice of the invention.

"Latex" in the specification and claims is taken to mean any dispersion of rubber, whether naturally or artificially formed, as well as similar dispersions of synthetic rubber or rubber-like materials. Obviously other liquids may be substituted for latex in the depositing apparatus of the invention.

While a written description and illustration of two embodiments of the invention are disclosed herein, it will be understood that various modifications can be made without departing from the scope of the invention as defined in the appended claims.

What is claimed is:

1. In apparatus for forming continuous film, thread or strip material from a liquid, the combination of means for receiving a continuous film of liquid, nozzle means having the discharge end thereof spaced from and immediately above said receiving means, said discharge end being outwardly flared along all planes which intersect the axis of said nozzle means, means for adjustably mounting the nozzle means with relation to the receiving means and at an acute angle to the receiving means, means for moving the receiving means past the nozzle means, and means for supplying the nozzle means continuously and controllably with the liquid, whereby both gravity and the surface tension of the liquid aid in depositing a continuous liquid film on the receiving means when a stream of the liquid is formed between the discharge end of the nozzle means and the receiving means and the receiving means is moved past said discharge end.

2. In apparatus for forming continuous rubber articles, the combination of means for receiving a continuous film of latex, nozzle means having a discharge end spaced from and immediately above said receiving means, said nozzle means forming an acute angle with said receiving means, said discharge end being outwardly flared along all planes which intersect the axis of said nozzle means, and means for continuously supplying said nozzle means with latex, whereby latex is continuously deposited on said receiving means.

3. In apparatus for forming continuous film, thread or strip material from a liquid, the combination of movable means for receiving a continuous film of liquid, nozzle means having a discharge end spaced from said receiving means, said discharge end being outwardly flared along all planes which intersect the axis of said nozzle means, and means for continuously supplying the nozzle means with the liquid, whereby the surface tension of the liquid aids in depositing a continuous liquid film on the receiving means when a stream of the liquid is formed between the discharge end of the nozzle means and the receiving means and the receiving means is moved past said discharge end.

4. In apparatus of the class described, the combination of movable means for receiving a continuous film of liquid, nozzle means for supplying a continuous stream of the liquid to form the continuous film on the receiving means, and means for adjustably mounting the nozzle means with relation to the receiving means, the nozzle means having a discharge end spaced from the receiving means, said discharge end being outwardly flared along all planes which intersect the axis of said nozzle means.

GEORGE P. BOSOMWORTH.